US006525430B1

(12) United States Patent
Asai et al.

(10) Patent No.: US 6,525,430 B1
(45) Date of Patent: Feb. 25, 2003

(54) PORTABLE ENGINE GENERATOR HAVING A FAN COVER WITH A CONTROL UNIT MOUNTING PORTION

(75) Inventors: Kouichi Asai, Wako (JP); Ryuji Tsuru, Wako (JP); Hiroyuki Eguchi, Wako (JP); Yasuhiro Shinkawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/572,747

(22) Filed: May 16, 2000

(30) Foreign Application Priority Data

May 20, 1999 (JP) .......................................... 11-140715

(51) Int. Cl.[7] ............................ H02K 5/00; F01P 1/00; H02P 9/04

(52) U.S. Cl. ......................... 290/1 A; 322/1; 123/41.56

(58) Field of Search ................................ 290/1 R, 1 C, 290/1 A; 123/41.56, 41.65, 7, 2

(56) References Cited

U.S. PATENT DOCUMENTS

| | | | | | |
|---|---|---|---|---|---|
| 3,919,620 | A | * | 11/1975 | McMurray et al. | 321/13 |
| 5,287,831 | A | * | 2/1994 | Andersen et al. | 123/179.3 |
| 5,636,606 | A | * | 6/1997 | Tsunoda et al. | 123/185.3 |
| 5,943,221 | A | * | 8/1999 | Asai et al. | 363/10 |
| 5,977,667 | A | * | 11/1999 | Hirose | 310/51 |
| 6,028,369 | A | * | 2/2000 | Hirose et al. | 290/1 A |
| 6,084,313 | A | * | 7/2000 | Frank | 290/40 C |
| 6,100,599 | A | * | 8/2000 | Kouchi et al. | 290/1 A |
| 6,124,702 | A | * | 8/2000 | Pinkerton et al. | 322/90 |
| 6,119,636 | A | * | 9/2000 | Fan | 123/2 |
| 6,181,019 | B1 | * | 1/2001 | Frank | 290/1 A |
| 6,192,840 | B1 | * | 2/2001 | Durr et al. | 123/195 R |
| D441,714 | S | * | 5/2001 | Yuzuriha | D13/116 |
| 6,232,672 | B1 | * | 5/2001 | Leufen et al. | 290/1 A |
| 6,331,740 | B1 | * | 12/2001 | Morohoshi et al. | 123/41.56 |
| 6,362,533 | B1 | * | 3/2002 | Morohoshi et al. | 123/41.56 |

FOREIGN PATENT DOCUMENTS

| | | | | |
|---|---|---|---|---|
| JP | 359108826 | A | * | 6/1984 |
| JP | 63171632 | | | 11/1988 |
| JP | 6-11535 | | | 3/1994 |

* cited by examiner

*Primary Examiner*—Nestor Ramirez
*Assistant Examiner*—Julio Gonzalez
(74) *Attorney, Agent, or Firm*—Adams & Wilks

(57) ABSTRACT

An engine generator comprises a fan cover made of die-cast aluminum alloy, and a power control unit including an aluminum base sheet. The base sheet has a power control circuit formed thereon. The fan cover includes a mounting portion to be attached to the power control unit. When the power control unit is attached to the fan cover, a surface of the aluminum base sheet comes into intimate contact with an outer surface of the mounting portion. Heat generated at the unit is transmitted to the fan cover, and then released from the fan cover serving as a heat releasing member.

18 Claims, 10 Drawing Sheets

PORTABLE ENGINE GENERATOR HAVING A FAN COVER WITH A CONTROL UNIT MOUNTING PORTION

BACKGROUND OF THE INVENTION

1. Field of the Invention

The present invention relates to an engine generator suitable for preventing temperature rise in a power control unit of the generator.

2. Description of the Related Art

Engine generators are used outdoors as general-purpose power supplies. In recent years, there has been an increased demand for outputs of such engine generators to be controlled by a power control unit such as an inverter.

Such a power control unit includes a circuit board on which an electric circuit for controlling power supplied from an engine generator is provided. When the electric circuit is supplied with a large electric current, the board produces a large amount of heat. Therefore, it becomes necessary for the thus-heated board to be cooled down.

Technique for cooling the above-described circuit board is known from, for example, Japanese Utility Model Laid-Open Publication No. SHO-63-171632 entitled "PORTABLE ENGINE GENERATOR" and Japanese Utility Model Post-Exam Publication No. HEI-6-11535 entitled "ELECTRONIC COMPONENT UNIT".

The engine generator disclosed in the Publication No. SHO-63-171632 includes an end surface cover forming therein openings for taking in air, and a box member having an outer surface facing towards the end surface cover. The box member accommodates therein a control circuit unit. On the cuter surface of the box member, there are provided a plurality of heat releasing fins. The adjacent fins define an intake passage therebetween. Air taken into the openings flows through the respective intake passages. With this arrangement, when the control circuit unit generates heat, the heat is transmitted to the box member. The box member is cooled by the air passing through the intake passages as described above.

The Publication No. HEI-6-11535 discloses an electronic component unit including a case of aluminum accommodating therein a base sheet on which plural electronic components are mounted. The case is filled with hardened resin to cover the base sheet. With this arrangement, heat generated by the base sheet is released by means of the case having improved thermal conductivity.

As disclosed in the Publication No. SHO-63-171632, the air is directed against the outer surface of the box member to thereby cool the box member having the control circuit accommodated therein. However, when the engine generator supplies large power to thereby cause the control circuit unit to generate a large amount of heat, the box member can not be sufficiently cooled because the outer surface of the box member having the fins provided thereon provides limited area. As a result, the control circuit unit is difficult to cool.

Also, when the electronic components as disclosed in the Publication No. HEI-6-11535 provide large power to thereby generate a large amount of heat, it is required that the surface of the case serving as a heat releasing sheet have an enlarged area or that a separate heat releasing sheet of large size be added to the base sheet such that the case can effectively release the heat therefrom. In such a case, however, the electronic component unit is inevitably made large in size.

SUMMARY OF THE INVENTION

An object of the present invention is to provide an engine generator including a power control unit and a heat releasing member which is formed from an existent member to thereby downsize the unit and which is disposed to effectively cool the unit to thereby prevent the temperature of the unit from rising.

According to an aspect of the present invention, there is provided an engine generator carrying thereon an engine and a generator driven by the engine, the engine generator comprising: a cooling fan mounted on a rotational shaft of the generator; a fan cover for covering the cooling fan; a power control unit including an aluminum base sheet forming thereon a power control circuit for controlling an output from the generator; the fan cover being made of die-cast aluminum alloy; the power control unit being attached to the fan cover with a surface of the aluminum base sheet intimately contacting an outer surface of the fan cover.

Heat generated by the control circuit unit is transmitted to the fan cover made of die-cast aluminum alloy. The heat is then released from the fan cover. The fan cover intimately contacts the surface of the aluminum base sheet of the power control. The cooling fan directs cooling air against the fan cover.

Since the surface of the aluminum base sheet intimately contacts the fan cover, the heat generated by the power control circuit can be efficiently transmitted to the fan cover. In addition, the cooling fan directs cooling air against the fan cover during the operation of the power control unit. Thus, the heat can be effectively released from the fan cover to thereby prevent temperature of the power control unit from rising.

The fan cover for covering the cooling fan serves as a heat releasing member for the power control unit. This eliminates the need to provide the power control unit with a separate heat releasing member of large size such as the heat releasing fins. Thus, it becomes possible to downsize the power control unit as well as to make small the number of parts forming the engine generator. Consequently, the cost of the engine generator can be reduced.

In a preferred form of the invention, the fan cover has a thick mounting portion formed thereon, the mounting portion having a flat outer surface to be attached to the surface of the aluminum base sheet.

The heat generated at the unit is transmitted from the surface of the aluminum base sheet of the unit to the entire fan cover through the thick mounting portion having the flat outer surface.

Since the mounting portion of the fan cover is made thick to thereby increase heat capacity thereof, the transmission of the heat to the fan cover is improved. It thus becomes possible to prevent the temperature of the unit from rising.

Moreover, the flat mounting portion is advantageous in that the intimate contact between the unit and the surface of the aluminum base sheet can be readily effected, and in that the mounting portion can be easily formed.

In a further preferred form of the present invention, the generator has a flywheel structure including an outer rotor fixed to the rotational shaft, the outer rotor having the cooling fan mounted thereon, and the fan cover for covering the cooling fan has a cylindrical configuration and is opener at opposite end portions either of which is secured to the engine and discharges cooling air therefrom.

The cooling fan directs cooling air along the cylindrical fan cover towards the engine to thereby cool the engine.

The cooling air is continuously taken into the fan cover of cylindrical configuration. The fan cover has the inner surface exposed to the cooling air. Therefore, heat transmitted to the fan cover can be effectively released therefrom.

In a still further preferred form of the present invention, the outer rotor includes permanent magnets, the cooling fan is formed from a centrifugal fan, the outer rotor and an inner surface of the fan cover define a passageway therebetween, and the cooling air is forced to flow through the passageway towards the engine.

The outer rotor includes the permanent magnets and the cooling fan is formed from the centrifugal fan. With this arrangement, the cooling air is directed radially outwardly from inside the cooling fan. The air is then forced to flow through the passageway, defined between the outer rotor and the inner surface of the fan cover, towards the engine.

Thus, since a large amount of cooling air is directed against the inside of the peripheral surface of the fan cover, the fan cover can be effectively cooled.

In a still further preferred form of the present invention, the power control unit is a cycloconverter unit or an inverter unit for converting an output from the generator into a power having a predetermined frequency.

The inverter unit or the cycloconverter unit converts the output from the generator into a power having a predetermined frequency.

An inverter or cycloconverter generates a large amount of heat corresponding to power loss caused when controlling a large power supplied from the generator. It was therefore difficult to reduce the size of a conventional inverter or cycloconverter unit. However, since the present invention employs the unit attached to the fan cover, the size of the unit can be reduced to ½to ⅓of the size of the conventional unit.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
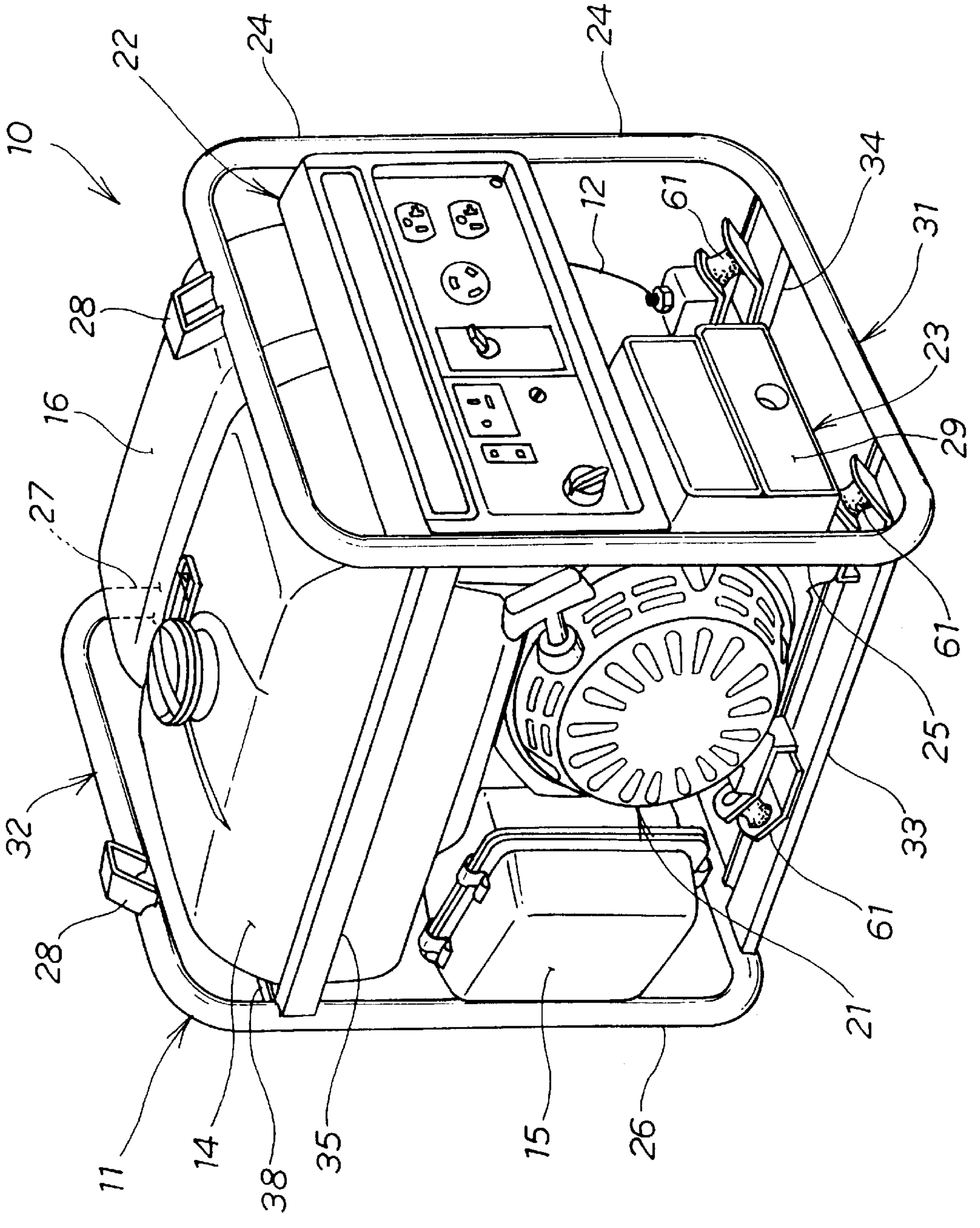
FIG. 1 is a perspective view of an engine generator according to the present invention.

Referring to FIG. 1, an engine generator 10 for use as a general-purpose power supply includes a frame 11 formed from a pipe frame, an engine 12, a generator 13 (see FIG. 7) driven by the engine 12, a fuel tank 14 for storing fuel for the engine 12, an air cleaner 15 connected to the engine 12, a muffler 18 (see FIG. 5) connected to the engine 12 and covered with an upper cover 16, a recoil starter 21 for starting the engine 12, a control box 22 to which an output from the generator 13 is input, and a cycloconverter unit 23 for use as a power control unit for converting an output from the generator 13 into a power having a predetermined frequency. The control box 22 accommodates therein an ignition control device 43 (see FIG. 2) for the engine 12 and the like. The air cleaner 15 is provided on an intake side of the engine 12. The muffler 18 is provided on an exhaust side of the engine 12. The power control unit may employ an inverter unit in lieu of the cycloconverter unit 23. All the engine 12, the generator 13, the fuel tank 14, the air cleaner 15, the muffler 18, the recoil starter 21, the control box 22, and the cycloconverter unit 23 are attached to the frame 11.

As shown in FIG. 1, the engine generator 10 includes the control box 22 provided forwardly thereof.

The frame 11 comprises front and rear frames 31, 32 provided forwardly and rearwardly of the engine generator 10, respectively, lower longitudinal beams 33, 34 each laid between the front and rear frames 31, 32, upper longitudinal beams 35, 36 (best shown in FIG. 4) each laid between the front and rear frames 31, 32, a front lateral beam 37 (see FIG. 2) laid between upper portions of the front frame 31, and a rear lateral beam 38 laid between upper portions of the rear frame 32. The front and rear frames 31, 32 have rectangular configurations.

The front frame 31 includes vertical portions 24, 25 while the rear frame 32 includes vertical portions 26, 27. Reference numerals 28, 28 denote positioning support portions provided on the front and rear frames 31, 32. By virtue of the positioning support portions 28, 28, a plurality of the engine generators 10 can be stacked with the support portions 28, 28 engaged with the lower longitudinal beams 33, 34. Denoted by reference numeral 29 is a converter cover for use as a cover of the cycloconverter unit 23.

Figure 2:
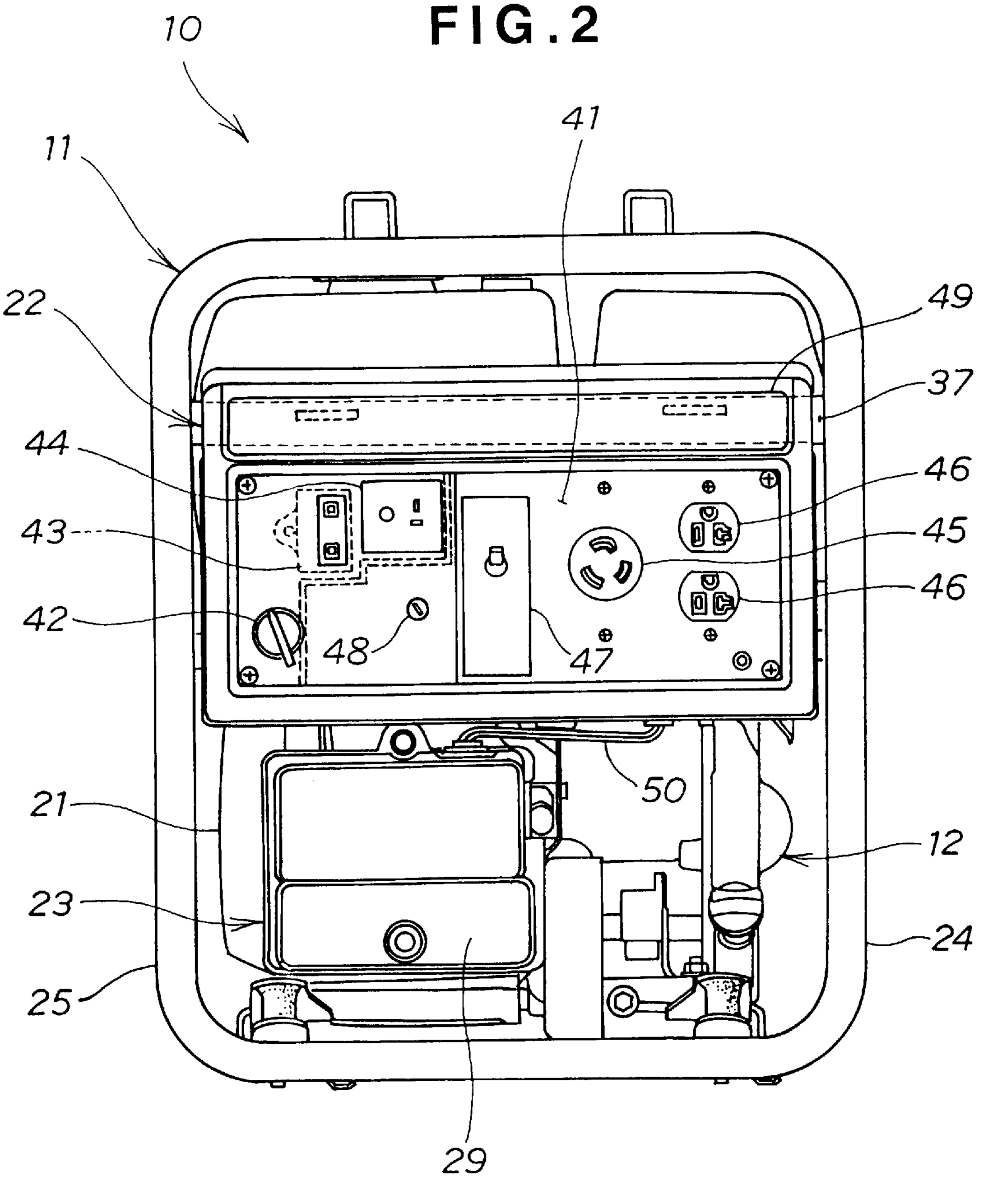
FIG. 2 is a front elevational view of the engine generator.

With reference to FIG. 2, the control box 22 has an operational panel 41 attached to a front side thereof. On the panel 41, there are mounted an engine switch 42 for an ignition system for placing the ignition system in an ON state, an ignition control device 43 for controlling ignition timing, a battery charge outlet 44 for providing a dc output to charge a battery disposed outside the engine generator 10, a first outlet 45 for outputting a large alternating current, second outlets 46, 46 for outputting small alternating currents each of which is smaller than the alternating current output from the first outlet 45, a circuit breaker 47 for blocking the flow of currents which are output from the first and second outlets 45, 46 and have levels exceeding a predetermined level, and a frequency switch 48 for switching to 50 or 60 Hz the frequencies of currents output from the first and second outlets 45, 46. A sticker 49 for showing the names of a manufacturer and a model of the control box 22 is stuck on the control box 22. The control box 22 includes inner components electrically connected to the cycloconverter unit 23 through a wire 50.

Figure 3:
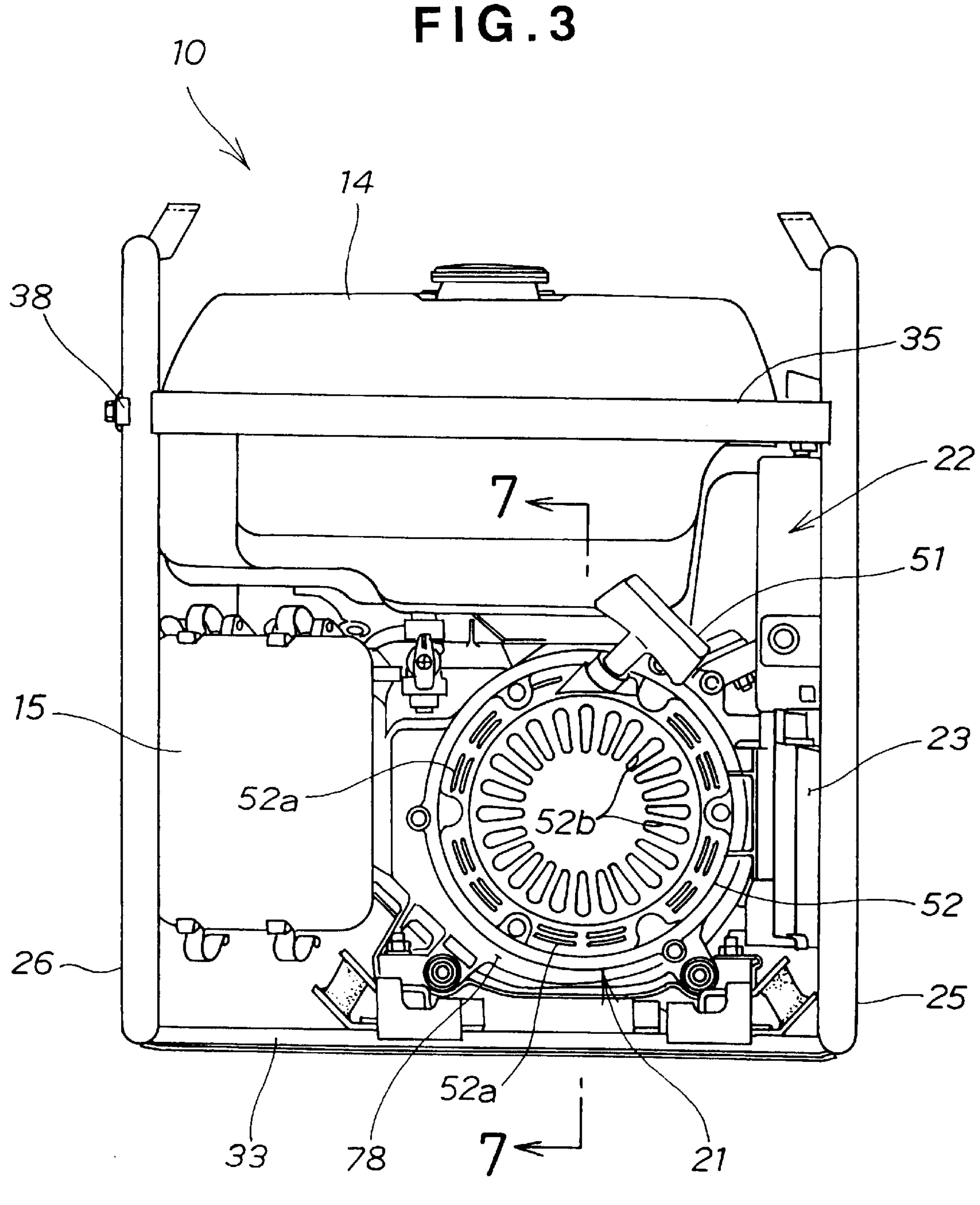
FIG. 3 shows the engine generator as viewed from a side on which a recoil starter is provided.

As shown in FIG. 3, the recoil starter 21 includes a pulley attached via a one-way clutch to a crankshaft 68 of the engine 12 provided behind the recoil starter 21. The pulley has a wire wound thereon. The wire includes its end connected to a handle 51. With this arrangement, when the handle 51 is pulled, the crankshaft 68 is rotated to thereby start the engine 12. The recoil starter 21 includes its rotating part covered with a cover 52. The cover 52 has plural slits 52*a*, 52*b* into which air is introduced.

Figure 4:
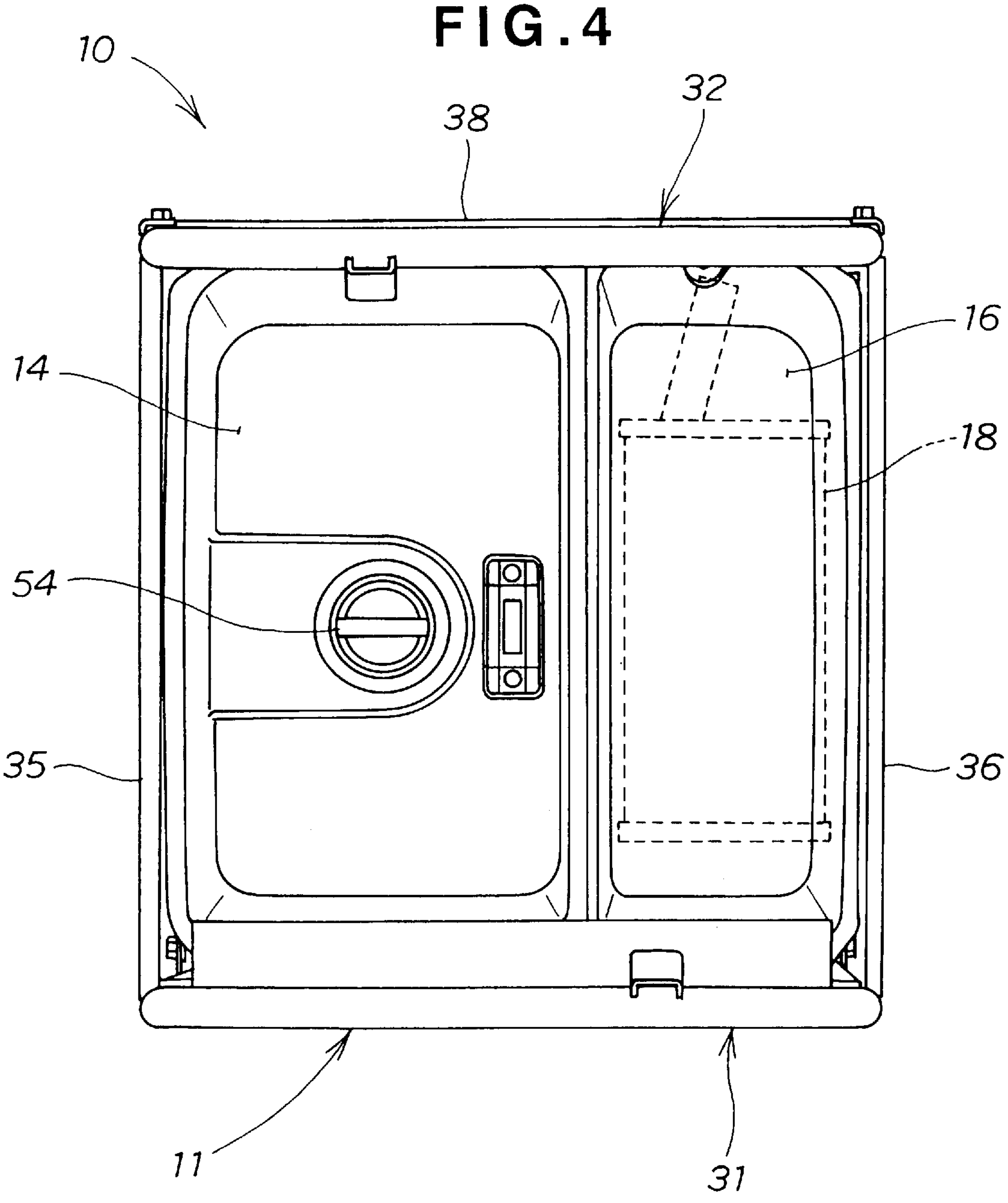
FIG. 4 is a top plan view of the engine generator.

Turning to FIG. 4, the fuel tank 14 and the muffler 18 are disposed in lateral alignment with each other.

The fuel tank 14 has front and rear parts thereof mounted to the front lateral beam 37 (see FIG. 2) and the rear lateral beam 38, respectively. The fuel tank 14 includes an opening into which a fuel is poured. Such an opening is closed by a cap 54.

Figure 5:
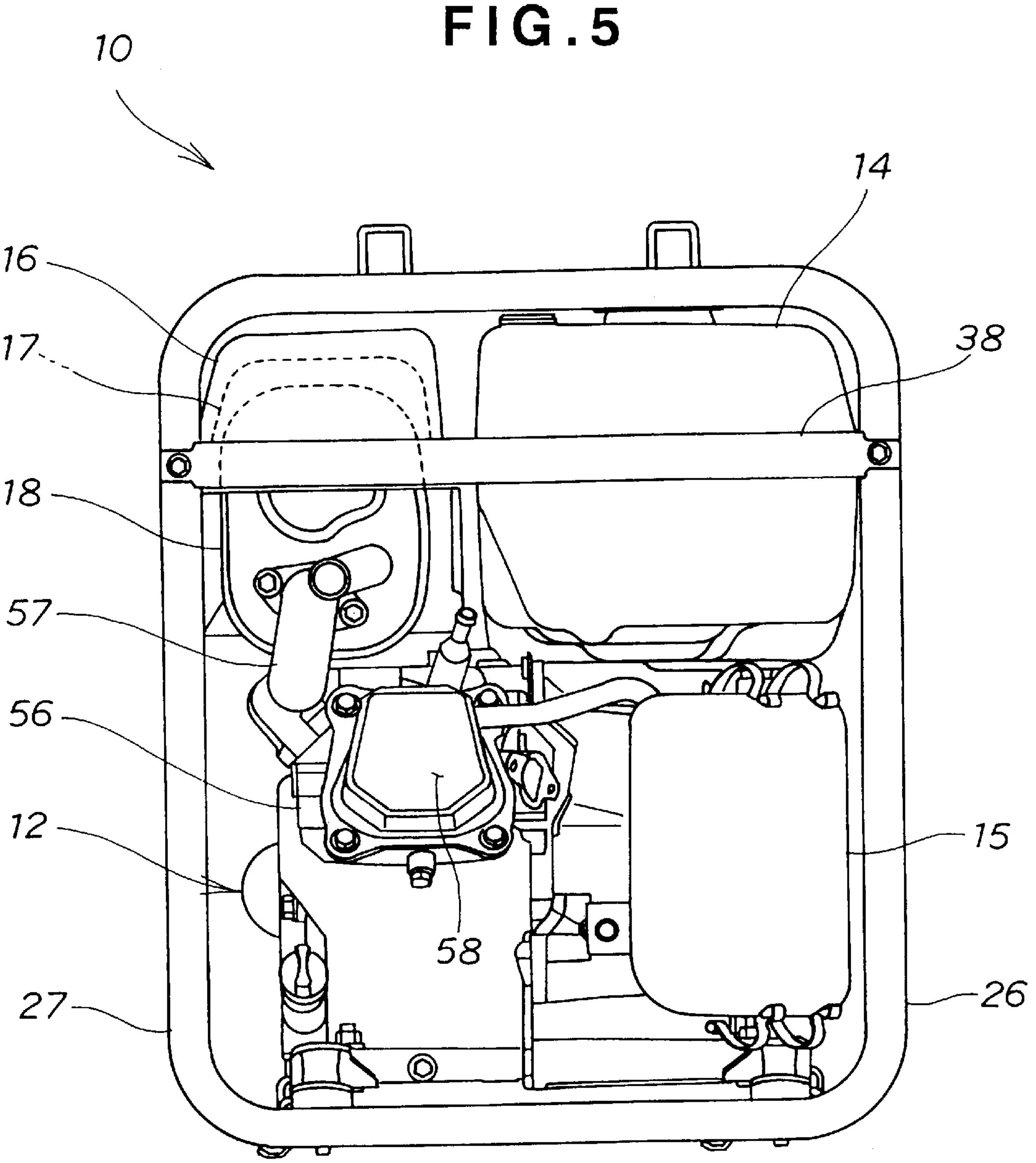
FIG. 5 is a rear elevational view of the engine generator.

Reference is made to FIG. 5. The engine 12 has a cylinder head 56 attached to an exhaust pipe 57. The exhaust pipe 57 is mounted to the muffler 18. The engine 12 includes a head cover 58.

The muffler 18 has an upper part thereof covered with a heatproof cover 17 disposed such that heat generated by the muffler 18 can not be transmitted to the fuel tank 14 and parts provided in the vicinity of the muffler 18. The cover 17 includes an upper part thereof covered with the upper cover 16.

Figure 6:
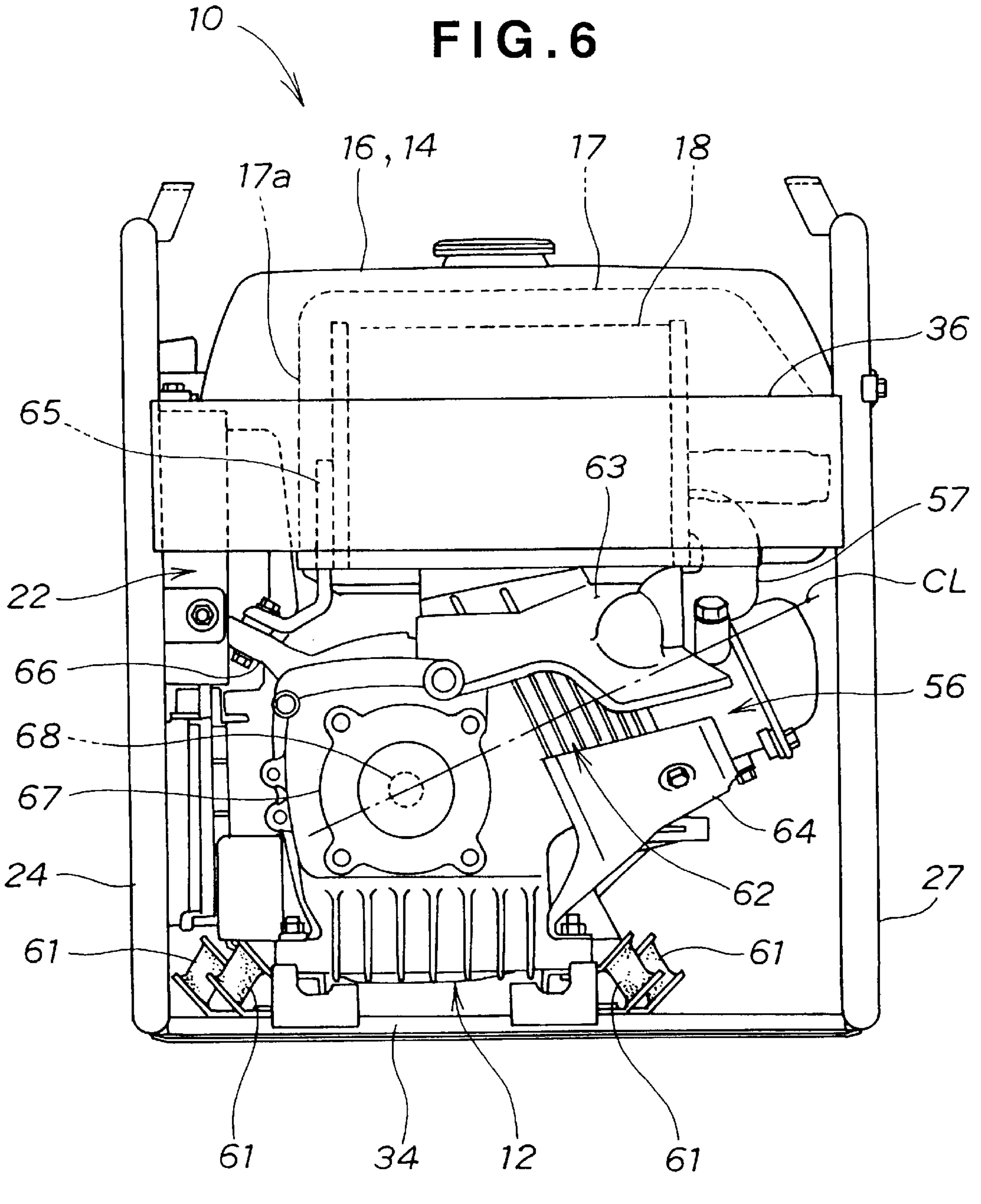
FIG. 6 shows the engine generator as viewed from a side on which an engine is provided.

As shown in FIG. 6, the engine 12 and the generator 13 are mounted to the lower longitudinal beams 34, 33 through mounting brackets 61.

The engine 12 has a cylinder portion 62 inclined rearwardly of the engine generator 10. In other words, the cylinder portion 62 is inclined away from the control box 22 provided forwardly of the engine generator 10. Also, the cylinder portion 62 is disposed below the muffler 18. The cylinder portion 62 has upper and lower engine shrouds 63, 64 mounted on upper and lower parts thereof, respectively. The shrouds 63, 64 are disposed such that cooling air flows over the cylinder portion 62 and the cylinder head 56. Reference character CL designates a cylinder axial line.

Since the cylinder portion 62 is inclined away from the control box 22, heat generated by the cylinder portion 62 is not transmitted to the control box 22.

The thus inclined cylinder portion 62 provides the advantage that the height of the engine 12 is made smaller to thereby make the overall height of the engine generator 10 smaller. Consequently, the engine generator 10 can be steadily disposed.

The muffler 18 has a front part thereof connected to an arm portion 66 by means of a stay 65. The arm portion 66 extends forwardly from the engine 12. A rear part of the muffler 18 is supported by an exhaust pipe 57 attached to the engine 12.

The muffler 18 and the control box 22 are disposed closely to each other with a front panel 17*a* of the cover 17 provided therebetween.

An end cover 67 is provided for covering one end portion of the crankshaft 68 extending in a direction perpendicular to this sheet.

Figure 7:
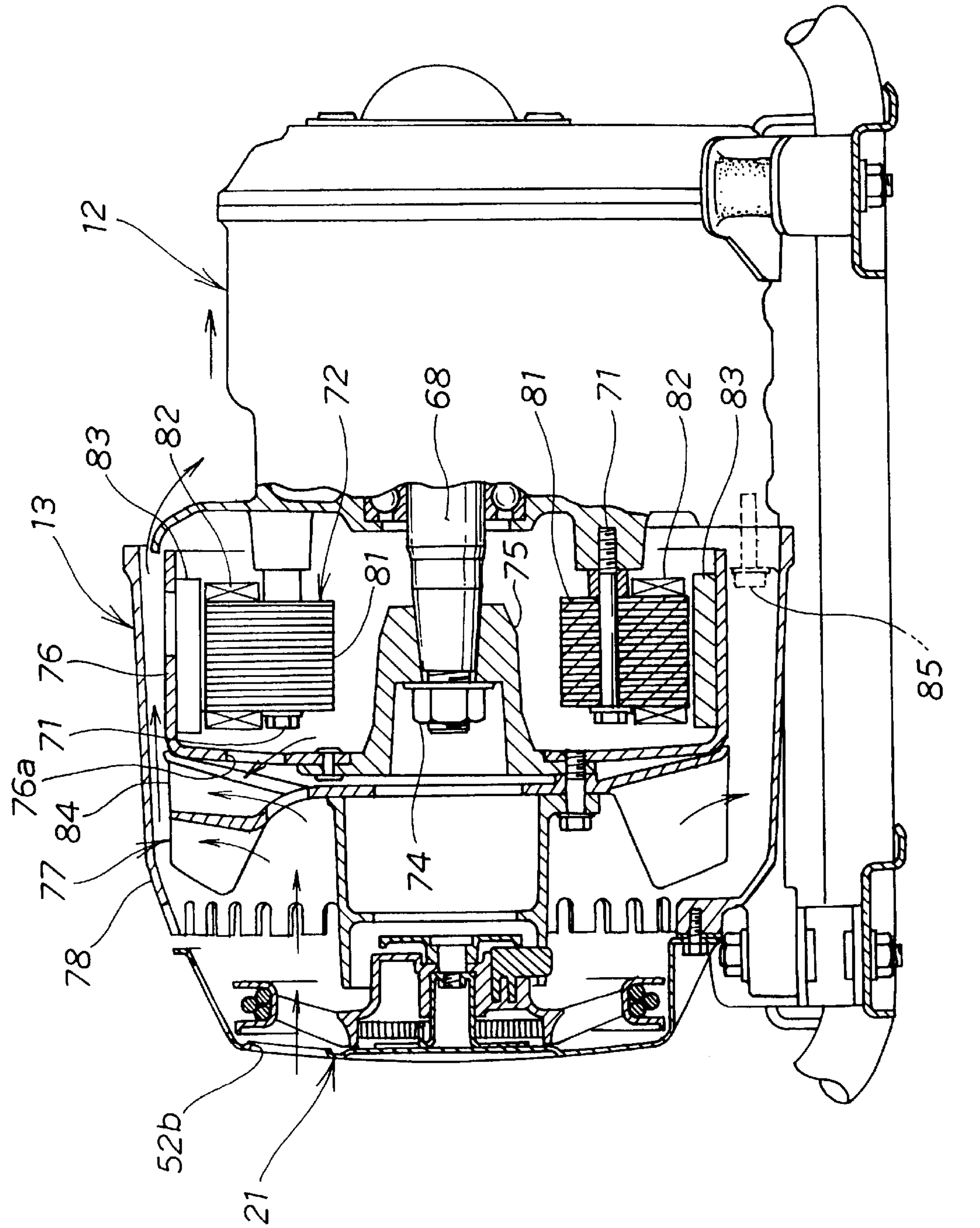
FIG. 7 is a cross-sectional view taken along line 7—7 of FIG. 3.

Reference is made to FIG. 7. The generator 13 is a multipolar generator including an outer rotor 76 of flywheel structure. The outer rotor 76 has one end thereof fixed to the crankshaft 68. More specifically, the generator 13 includes stators 72 attached to an end surface of the engine 12 by means of bolts 71, 71, a flange member 75 mounted on another end portion of the crankshaft 68 through a nut 74, the cup-shaped outer rotor 76 mounted on the flange member 75 and disposed radially outwardly of and closely to the stator 72, a cooling fan 77 mounted on a front part of the flange member 75, and a substantially cylindrical fan cover 78 for covering the cooling fan 77 and the outer rotor 76. The outer rotor 76 includes a front part forming therein apertures 76*a* (only one shown) through which air passes. The crankshaft 68 serves as a rotational shaft of the generator 13.

The stator 72 includes a stator core 81 and a stator coil 82 wound on the stator core 81. The stator core 81 has plural magnetic materials such as metal sheets laid one on the other.

The outer rotor 76 has permanent magnets 83 mounted on an inner peripheral surface thereof.

Since the generator 13 includes the outer rotor 76 thus arranged, it is unnecessary to provide wires to the outer rotor 76. Thus, the outer rotor 76 becomes simple in structure.

The cooling fan 77 is a centrifugal fan including blades 84. The rotation of the blades 84 of the fan 77 causes air to flow radially outwardly from inside the blades 84.

The fan cover 78 is a die-cast product of aluminum alloy attached to the end surface of the engine 12 through bolts 85 (only one shown).

The rotation of blades 84 of the cooling fan 77 further causes the thus outwardly flowing air to flow through a passageway, defined between the outer rotor 76 and the fan cover 78, towards the engine 12. The generator 13 and the engine 12 can be therefore cooled.

Figure 8:
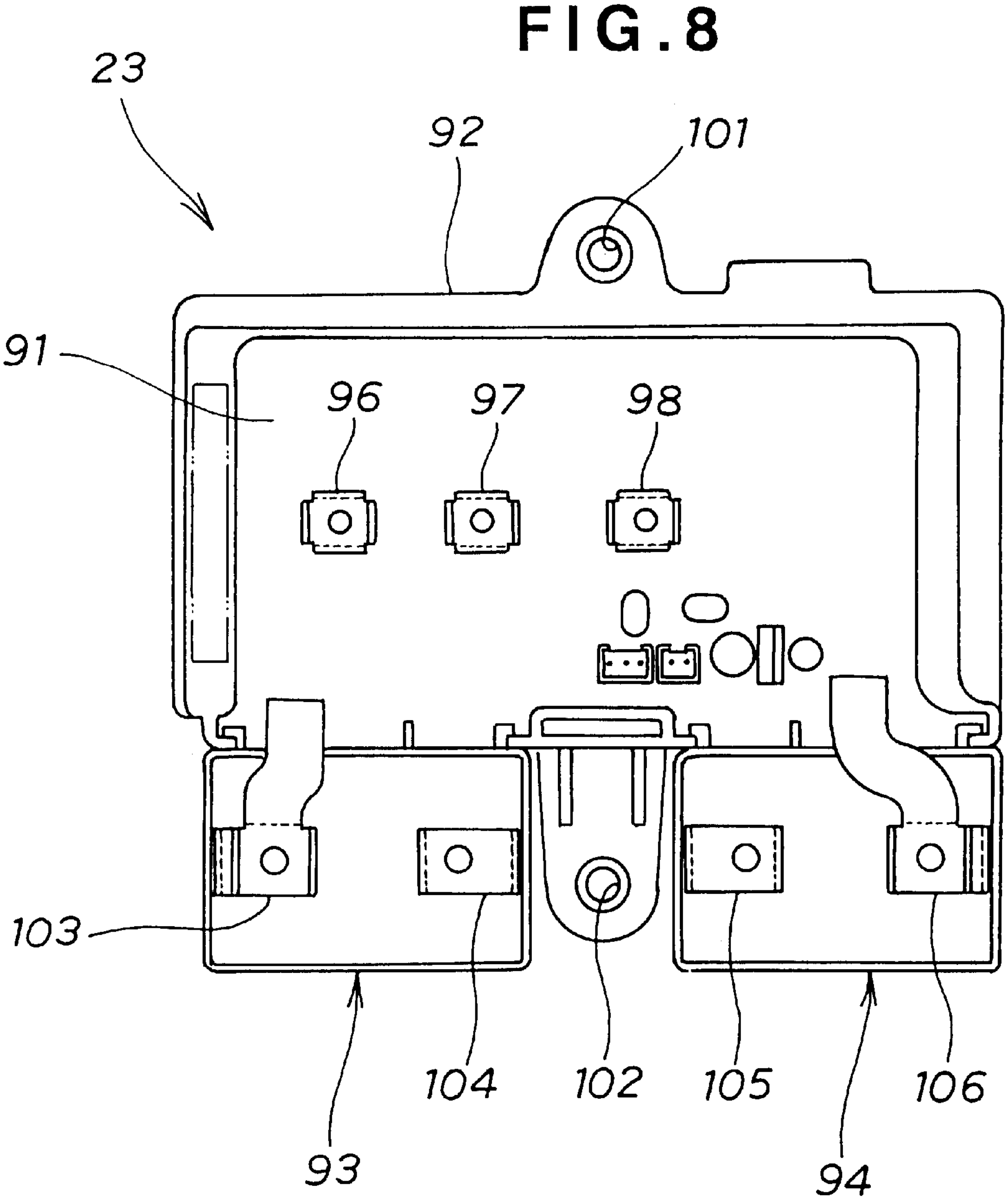
FIG. 8 shows a cycloconverter unit of the engine generator with a converter cover removed.

Referring to FIG. 8, the cycloconverter unit 23 for use as a power control unit converts an output from the generator 13 (see FIG. 7) into a power having a predetermined frequency. For example, the frequency of an alternating-current output from the generator 13 is converted into a frequency of 50 or 60 Hz by the unit 23. The cycloconverter unit 23 includes an aluminum base sheet 91 having electronic components mounted thereon, a case 92 for receiving the base sheet 91 therein, capacitors 93, 94 having large capacitances, and the converter cover 29 for covering the case 92 and the capacitors 93, 94. More specifically, the case 92 and the capacitors 93, 94 include a front side on which the electronic components are provided. Such a front side is covered with the cover 29. The capacitors 93, 94 are mounted to a lower part of the case 92. The case 91 is filled with hardened resin to cover the electronic components mounted on the base sheet 91.

Formed at the aluminum base sheet 91 is a power control circuit 95 (see FIG. 9) for controlling an output from the generator 13. The base sheet 91 includes input terminals 96, 97, 98 provided on the front side. An output from the generator 13 is input to the terminals 96, 97, 98. The base sheet 91 has a flat surface 112 (see FIG. 9) provided at a side opposite to the front side.

The case 92 includes case mounting holes 101, 102 for use in attaching the cycloconverter unit 23 to the fan cover 78.

The capacitors 93, 94 serving as filters include output terminals 103, 104, 105, 106 for providing outputs having frequencies converted by the unit 23. These terminals 103, 104, 105, 106 are connected to the first outlet 45 and the second outlets 46, 46 as shown in FIG. 2.

Although the cycloconverter unit 23 or the inverter unit serving as the power control unit generates a large amount of heat corresponding to loss caused by the conversion of power supplied from the generator 13, the unit can be effectively cooled to thereby prevent the temperature of unit from rising. Moreover, the unit 23 can be made small in size.

Figure 9:
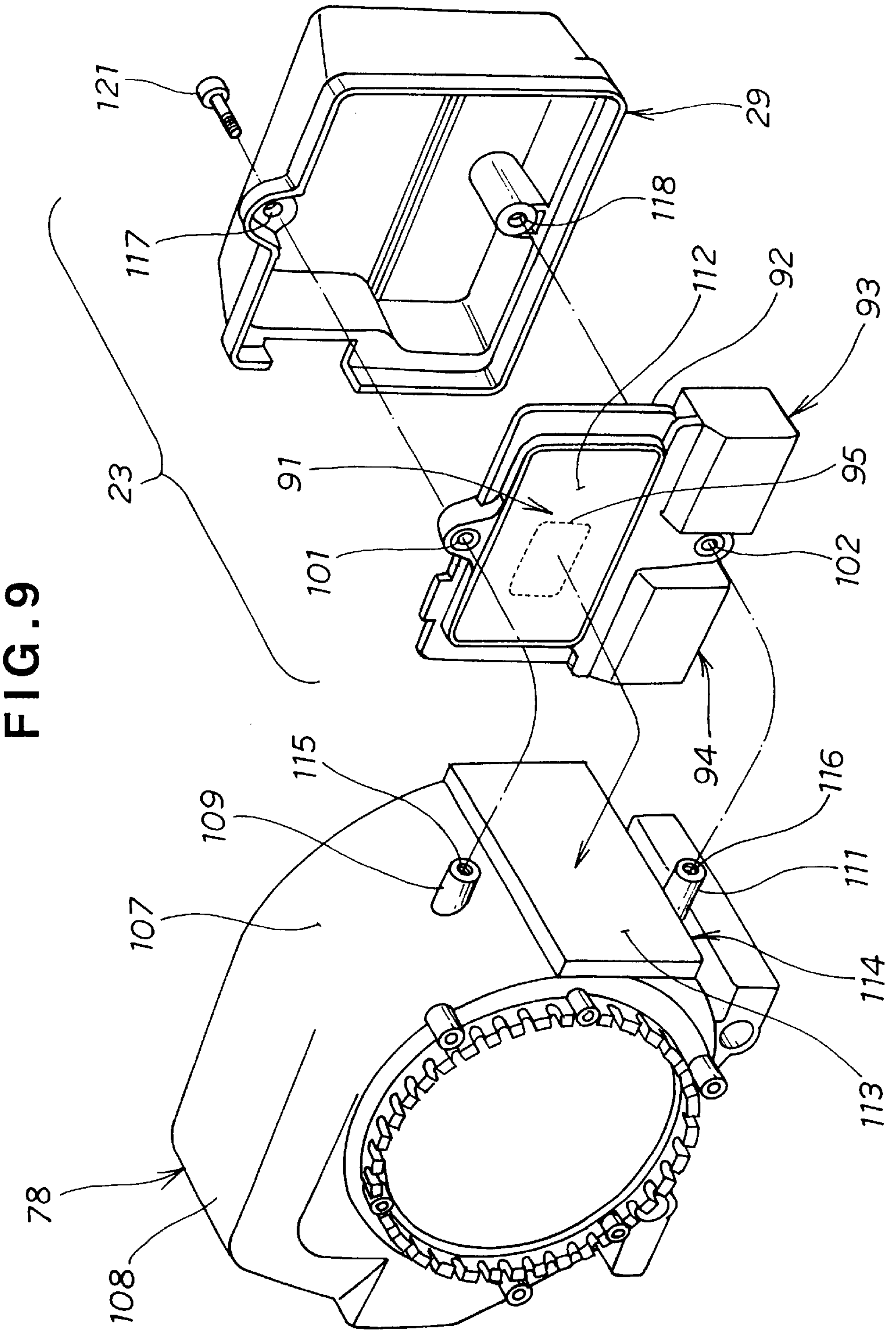
FIG. 9 shows in perspective a fan cover and the cycloconverter unit exploded.

Turning to FIG. 9, the fan cover 78 includes a curved side wall 107 and a bulged wall 108. On the wall 107, there are mounted boss portions 109, 111 for use in attaching the unit 23 thereto, and a thick mounting portion 114 having a flat outer surface 113. The outer surface 113 is flatten to intimately contact the surface 112 when the unit 23 is attached to the fan cover 78. The boss portions 109, 111 have internal threads 115, 116 formed therein.

The converter cover 29 has cover mounting holes 117, 118 formed therein. The cycloconverter unit 23 is attached to the fan cover 78 through two bolts 121, 121 (only one shown). More specifically, for attachment of the unit 23 to the fan cover 78, the one bolt 121 is screwed into the boss portion 115 through the holes 117, 101 while the other bolt 121 is screwed into the boss portion 111 through the holes 118, 102 to thereby bring the surface 112 into intimate contact with the outer surface 113.

As described above, the power control circuit 95 for controlling an output from the generator 13 is formed at the aluminum base sheet 91 of the cycloconverter unit 23. On the fan cover 78, there is formed the mounting portion 114 having the flat outer surface 113 to be attached to the sheet surface 112. Because the outer surface 113 is flat, the intimate contact between the surface 112 and the outer surface 113 can be easily effected. Further, the mounting portion 114 can be readily formed.

Figure 10:
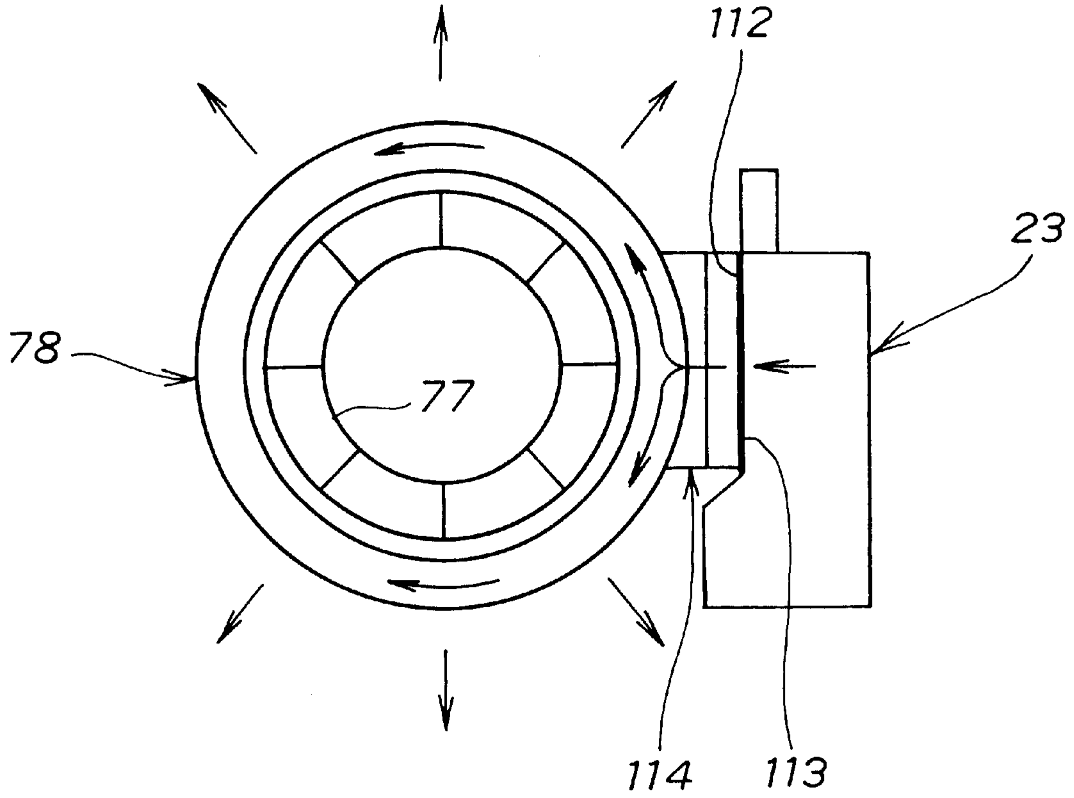
FIG. 10 shows how the fan cover is operated to release heat generated by the cycloconverter.

Discussion will be made as to operation of cooling the fan cover 78 having the cycloconverter unit 23 attached thereto in relation to FIG. 10.

As indicated by arrows, heat generated by the unit 23 is transmitted from the surface 112 to the entire fan cover 78 through the mounting portion 114 and the outer surface 113 provided in intimate contact with the surface 112. The heat is then released from the fan cover 78 into the air.

Because the surface 112 of the unit 23 is in intimate contact with the outer surface 113 of the die-cast fan cover 78 of aluminum alloy, heat is efficiently transmitted from the unit 23 to the fan cover 78.

The mounting portion 114 of the fan cover 78 is made thick to thereby provide the mounting portion 114 with increased heat capacity thereof. Therefore, the heat generated by the unit 23 is transmitted to the fan cover 78 more satisfactorily through the thick mounting portion 114 than through a less thick mounting portion 114.

The fan cover 78 has heat transmitted thereto in the above manner as the unit 23 is operated. However, since the peripheral surface of the fan cover 78 has a large area and the cooling fan 77 continuously directs cooling air against the inside of the peripheral surface when rotating, the fan cover 78 can be effectively cooled to prevent the temperature of the unit 23 from rising.

In other words, the thus arranged fan cover 78 for covering the cooling fan 77 serves as a heat releasing member for releasing heat generated by the unit 23 to thereby eliminate the need to provide the unit 23 with a separate heat releasing member. Thus, the number of parts forming the engine generator 10 can be made small to thereby reduce the cost of the engine generator 10.

Turning back to FIG. 7, as the engine 12 is operated to rotate the cooling fan 77, cooling air passes through a first passage. This means that the cooling air flows through the slits 52*a*, 52*b* and the recoil starter 21 into the fan cover 78, whereafter the air is directed to the inside of the fan 77 and then flows radially outwardly from inside the fan 77 into passageways defined between the cooling fan 77 and an inner surface of the fan cover 78 and between the outer rotor 76 and the inner surface of the fan cover 78, as indicated by arrows. After passing through these passageways, the air flows over an outer surface of the engine 12. Also, the rotation of the fan 77 causes cooling air to pass through a second passage. This means that the cooling air flows radially outwardly from within the outer rotor 76 of the generator 13 through the apertures 76*a* (only one shown). Between the engine 12 and the generator 13, there are formed intake openings (not shown). Through such openings, cooling air is introduced into the outer rotor 76.

That is, the engine generator 10 is cooled by the cooling air passing through the first and second passages.

As described above, the rotation of the cooling fan 77 formed from the centrifugal fan forces the cooling air to flow towards the engine 12 through the passageway defined between the inner surface of the fan cover 78 and the outer rotor 76.

With this arrangement, the first and second passages become simple in configuration. Since the thus arranged passages provide a reduced resistance to the flow of cooling air, the cooling air is efficiently directed to the generator 13, the fan cover 78, and the engine 12. Therefore, the generator 13, the fan cover 78, and the engine 12 can be sufficiently cooled.

The cylindrical fan cover 78 for covering the cooling fan 77 has one end secured to the engine 12. Therefore, the rotation of the cooling fan 77 causes cooling air to flow along the fan cover 78 towards the engine 12. Further, heat generated by the engine 12 is transmitted directly to the fan cover 78, whereafter the heat is released from the fan cover 78. Consequently, it becomes possible to cool the engine 12 by means of both the cooling air and the fan cover 78.

Obviously, various minor changes and modifications of the present invention are possible in the light of the above teaching. It is therefore to be understood that within the scope of the appended claims, the present invention may be practiced otherwise than as specifically described.

What is claimed is:

1. An engine-driven generator unit having an engine and an electric power generator driven by said engine, said engine-driven generator unit comprising:

a cooling fan mounted on a rotational shaft of said electric power generator;

a fan cover for covering said cooling fan, the fan cover being made of die-cast aluminum alloy; and a power control unit comprising an aluminum base sheet and a power control circuit provided thereon for controlling an output from said electric power generator, the power control unit being attached to said fan cover with a surface of said aluminum base sheet intimately contacting an outer surface of said fan cover.

2. An engine-driven generator unit according to claim 1; wherein said fan cover has a thick mounting portion, said mounting portion having a flat outer surface attached to said surface of said aluminum base sheet.

3. An engine-driven generator unit according to claim 1; wherein said electric power generator includes an outer rotor serving as a flywheel of the engine, said outer rotor having one end thereof fixed to said rotational shaft, said outer rotor having said cooling fan mounted thereon, and said fan cover for covering said cooling fan has a cylindrical configuration and is opened at opposite end portions either of which is secured to said engine and discharges cooling air therefrom onto an outer peripheral surface of the engine.

4. An engine-driven generator unit according to claim 3; wherein said outer rotor includes permanent magnets, said cooling fan is a centrifugal fan, an annular passageway is defined between said outer rotor and an inner surface of said fan cover, and said cooling air is forced to flow through said passageway towards said engine.

5. An engine-driven generator unit according to claim 1; wherein said power control unit comprises one of a cycloconverter unit and an inverter unit for converting an output from said electric power generator into a power having a predetermined frequency.

6. An engine-driven generator unit according to claim 3; wherein the cooling fan comprises a centrifugal cooling fan device that forces cooling air between the outer rotor and the fan cover so as to send the cooling air to the outer peripheral surface of the engine.

7. An engine-driven generator unit according to claim 1; wherein the fan cover has an opening at a first end proximate the engine, and the cooling fan has a first rotary blade member for drawing outside air and blowing the air to cool the engine and the electric power generator.

8. An engine-driven generator unit according to claim 1; wherein the electric power generator is a multipolar generator having a magnet rotor, and the power control circuit converts an output of the multipolar generator into an alternating current of a predetermined frequency.

9. An engine-driven generator unit according to claim 1; wherein the engine has a cylinder inclined sideways obliquely and a muffler disposed in a space above the cylinder.

10. An engine-driven generator unit according to claim 9; wherein the muffler is substantially cylindrical and elongated in a direction perpendicular to the output shaft of the engine.

11. An engine-driven generator unit according to claim 1; further comprising an engine shroud covering a portion of the engine and having one end disposed proximate the fan cover so that air blown out of the fan cover by the cooling fan passes between the engine shroud and the engine to cool the engine.

12. An engine-driven generator unit according to claim 1; wherein the fan cover has a first end disposed proximate the engine and a second end disposed remote from the engine; and further comprising a recoil starter for starting the engine attached to the second end of the fan cover.

13. An engine-driven generator unit comprising: an engine; an electric power generator driven by the engine; a cooling fan mounted to a rotary output shaft of the engine; a thermally conductive fan cover covering the cooling fan and the electric power generator; and a power control unit comprising a thermally conductive metallic base sheet and a power control circuit provided on the base sheet for controlling an output of the electric power generator, the power control unit being attached to the fan cover so that a surface of the base sheet is in direct contact with an outer surface of the fan cover.

14. An engine-driven generator unit according to claim 13; wherein the fan cover is formed of a die-cast aluminum alloy, and the base sheet is formed of aluminum.

15. An engine-driven generator unit according to claim 13; wherein the fan cover has a flat surface at a location where the base sheet of the power control unit is attached.

16. An engine-driven generator unit according to claim 13; wherein the electric power generator has an outer rotor serving as a flywheel of the engine, the outer rotor has one end fixed to the rotary output shaft, the cooling fan is mounted to the outer rotor, and the fan cover has a generally cylindrical shape and is opened at opposite ends thereof, one of the ends being disposed proximate the engine to discharge cooling air therefrom onto the engine.

17. An engine-driven generator unit according to claim 16; wherein the cooling fan is a centrifugal fan for drawing air from outside the electric power generator into the fan cover, through an annular passageway defined between the outer rotor and an inner surface of the fan cover, and out a discharge portion of the fan cover onto the engine.

18. An engine-driven generator unit according to claim 13; wherein the power control unit comprises one of a cycloconverter unit and an inverter unit for converting an output of the generator into a power having a predetermined frequency.

* * * * *